United States Patent
Hohmann et al.

(10) Patent No.: US 11,711,027 B2
(45) Date of Patent: Jul. 25, 2023

(54) POWER MODULE FOR OPERATING AN ELECTRIC VEHICLE DRIVE SYSTEM

(71) Applicant: ZF Friedrichshafen AG, Friedrichshafen (DE)

(72) Inventors: Fabian Hohmann, Hofbieber (DE); Stefan Hain, Speichersdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/360,928

(22) Filed: Jun. 28, 2021

(65) Prior Publication Data
US 2021/0408941 A1    Dec. 30, 2021

(30) Foreign Application Priority Data
Jun. 30, 2020  (DE) ............... 10 2020 208 152.2

(51) Int. Cl.
| | | |
|---|---|---|
| *H02P 27/08* | (2006.01) | |
| *H02M 7/5387* | (2007.01) | |
| *H02M 7/5395* | (2006.01) | |
| *B60L 15/08* | (2006.01) | |
| *B60L 15/00* | (2006.01) | |

(52) U.S. Cl.
CPC ....... *H02M 7/5387* (2013.01); *H02M 7/5395* (2013.01); *H02P 27/08* (2013.01); *B60L 15/007* (2013.01); *B60L 15/08* (2013.01)

(58) Field of Classification Search
CPC ... H02P 27/08; H02M 7/5395; H02M 7/5387; B60L 15/007; B60L 15/08
See application file for complete search history.

(56) References Cited

U.S. PATENT DOCUMENTS

| | | | | |
|---|---|---|---|---|
| 5,612,614 A | * | 3/1997 | Barrett, Jr. .............. | G05F 3/262 323/314 |
| 7,313,176 B1 | * | 12/2007 | Groen .............. | H03K 19/00369 375/219 |
| 7,672,106 B1 | * | 3/2010 | Sullivan ................. | H05B 39/02 361/93.8 |

(Continued)

FOREIGN PATENT DOCUMENTS

| | | |
|---|---|---|
| DE | 10356468 A1 | 10/2004 |
| DE | 112012007241 T5 | 10/2015 |

(Continued)

OTHER PUBLICATIONS

Search Report issued in German Patent Application No. DE 10 2020 208 152.2 dated Feb. 23, 2021 (10 pages).

*Primary Examiner* — Rina I Duda
(74) *Attorney, Agent, or Firm* — Crowell & Moring LLP

(57) ABSTRACT

A power module for operating a vehicle, in particular an electric vehicle and/or a hybrid vehicle, comprising numerous semiconductor components, which form at least one topological switch; an input contact for supplying an input current to the semiconductor components; a control electronics for controlling the semiconductor components, to generate an output current based on the input current; an output contact for outputting the output current; wherein the control electronics is configured to set a gate current for one of the semiconductor components based on one or more status parameters for the semiconductor component.

16 Claims, 3 Drawing Sheets

(56) References Cited

U.S. PATENT DOCUMENTS

| | | | |
|---|---|---|---|
| 7,777,433 B2* | 8/2010 | Yamaguchi | H02M 7/003 |
| | | | 363/15 |
| 9,961,808 B2* | 5/2018 | Lei | H02M 7/003 |
| 2007/0008679 A1 | 1/2007 | Takahasi et al. | |
| 2010/0073659 A1* | 3/2010 | Mikami | G03B 27/72 |
| | | | 355/69 |
| 2010/0225363 A1 | 9/2010 | Takahashi et al. | |
| 2011/0286185 A1* | 11/2011 | Abe | H05K 7/209 |
| | | | 361/710 |
| 2012/0013370 A1 | 1/2012 | Mori | |
| 2015/0365038 A1* | 12/2015 | Saha | H02M 7/53873 |
| | | | 318/139 |
| 2015/0381167 A1* | 12/2015 | Sicard | H03K 17/687 |
| | | | 327/109 |
| 2019/0296636 A1 | 9/2019 | Ikeda | |

FOREIGN PATENT DOCUMENTS

| | | |
|---|---|---|
| DE | 112012007247 T5 | 10/2015 |
| DE | 102016100775 A1 | 7/2016 |
| JP | 2016-127435 | 7/2016 |

\* cited by examiner

POWER MODULE FOR OPERATING AN ELECTRIC VEHICLE DRIVE SYSTEM

CROSS-REFERENCE TO RELATED APPLICATIONS

This application claims priority from German Application No. DE 10 2020 208 152.2, filed on Jun. 30, 2020, the entirety of which is hereby fully incorporated by reference herein.

TECHNICAL FIELD

The present invention relates to the field of electric mobility, in particular the power modules for operating an electric vehicle drive.

TECHNICAL BACKGROUND

Power modules, in particular integrated power modules, are increasingly used in motor vehicles. These power modules are used, e.g., in DC/AC inverters that are used to power electric machines such as electric motors with a multiphase alternating current. A direct current generated by a DC power source, e.g. a battery, is converted to a multiphase alternating current for this. The power modules are based on power semiconductors, in particular transistors such as IGBTs, MOSFETs, and HEMTs. Other fields of application are DC/DC converters and AD/DC converters and transformers.

Power switches are normally formed from the power semiconductors or semiconductor components, which are used in a bridge circuit. A common example is the so-called half-bridge, which comprises a high-side component and a low-side component. The high-side and low-side components are therefore to be regarded as so-called topological switches, which comprise numerous semiconductor components connected to one another in parallel, or parallelized. There can be numerous high-side topological switches and/or numerous low-side topological switches in the power modules.

Through targeted switching of the high-side and low-side switches (topological switches), the direction of the current (output current) generated at the output of the power module can be alternated in very short cycles between a positive current direction and a negative current direction. In the case of a DC/AC inverter this allows for a so-called pulse-width modulation for generating an alternating current based on a direct current supplied to the input of the power module.

In all of these applications it is advantageous when the switching time for the power switch that is used is short enough. Due to the progress made in the field of power semiconductors, short switching times can be obtained using so-called wide bandgap semiconductors (semiconductors with large bandgaps), such as SiC and GaN.

The targeted switching of the power switches is obtained and implemented by a control electronics. The control electronics preferably comprises a controller component for generating a control signal based on an operating state of the electric vehicle drive and/or the power module, and a driver in communication with the controller component for controlling the power switch based on the control signal.

When operating the electric vehicle drive, the switching speed, or switching time, between two on and off switching procedures in the power module plays an important role. The short switching times obtained with wide bandgap semiconductors could lead to voltage jumps if the leakage inductances in the power module are large enough, which exceed the overvoltage (i.e. the maximum acceptable operating voltage, or drain-source voltage) in the semiconductor components forming the topological switches, having a negative effect thereon. Under extreme operating conditions, i.e. at high operating temperatures and/or high operating currents through the semiconductor components, voltage jumps become more frequent, resulting in a higher probability of damage to the semiconductor components.

The fundamental object of the invention is therefore to effectively prevent voltage jumps in power modules.

This object is achieved by a power module and an inverter according to the independent claims.

The power module in the framework of this invention is used to operate an electric drive in a vehicle, in particular an electric vehicle and/or a hybrid vehicle. The power module is preferably used in a DC/AC inverter. In particular, the power module is used to power an electric machine, e.g. an electric motor and/or a generator. A DC/AC inverter is used to generate a multiphase alternating current from a direct current generated from a DC voltage from a power source, e.g. a battery.

The power module has numerous topological switches. These semiconductor-based topological switches each comprise numerous semiconductor components that are connected to one another in parallel and are used to generate an output current by activating the individual semiconductor components based on the input current. The topological switches are controlled by a control electronics that comprises one or more printed circuit boards populated with numerous electronic components. The control electronics preferably comprises a controller component for generating a control signal based on an operating state of the power module and a driver for controlling the topological switches based on the control signal. The control can be based on a so-called pulse-width modulation. In the case of an inverter, the input current is a direct current, and the output current is an alternating current.

The numerous power switches preferably form a bridge circuitry, which can comprise one or more bridge circuits (i.e. half-bridges). Each bridge circuit or half-bridge comprises one or more high-side switches (HS switches) connected in parallel, and one or more low-side switches (LS switches) connected in parallel. The HS switch(es) are connected to the LS switch(es) in series. In the case of an inverter, each half-bridge is dedicated to one current phase in the multi-phase alternating current (output current). The HS switch and the LS switch each comprise one or more power semiconductor components, e.g. IGBT, MOSFET, HEMT. The fundamental semiconductor material for the respective power semiconductor component preferably comprises a so-called wide bandgap semiconductor (semiconductor with a wide bandgap), e.g. silicon carbide (SiC) or gallium nitride (GaN), and/or it can comprise silicon.

A heatsink to which the topological switches are thermally coupled can be provided for cooling the topological switches and other electronic components in the power module. Coolant lines are preferably formed in the heatsink through which a coolant, i.e. water, flows. Furthermore, a DC link capacitor can be connected in parallel to the topological switches for smoothening the input voltage.

The control electronics is designed to set a gate current for one of the semiconductor components, preferably all of the semiconductor components, based on one or more status parameters for the semiconductor component or semiconductor components.

In this manner, depending on the operating state of the semiconductor component or semiconductor components, they can be controlled with an appropriate gate current, such that the overvoltage of the semiconductor component or semiconductor components is not exceeded. This measure protects the semiconductor components and ensures that the power module will function correctly.

Advantageous embodiments and developments are described in the dependent claims.

Embodiments shall now be described by way of example and in reference to the attached drawings. Therein:

The same reference symbols are used for the same or functionally similar elements in the drawings.

Figure 1:
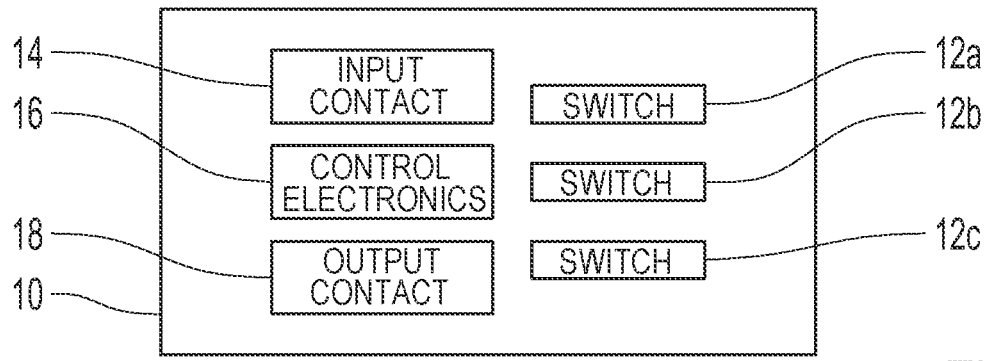
FIG. 1 shows a schematic illustration of a power module.

FIG. 1 shows a schematic illustration of a power module 10 according to one embodiment. The power module 10 has numerous topological switches 12a-c. These semiconductor-based topological switches 12a-c each comprise numerous semiconductor components (not shown here), which are connected to one another in parallel and are used to generate an output current by controlling the individual semiconductor components based on the input current supplied via an input contact 14 on the power module 10. The output current is sent to an external entity, e.g. the engine coils in an electric vehicle drive via an output contact 18 on the power module 10 in order to supply the electric vehicle drive with electricity.

The topological switches are controlled by the control electronics 16 in the power module, which has one or more printed circuit boards populated with numerous electronic components. The control electronics 16 preferably comprises a controller component for generating a control signal based on an operating state of the power module 10 and a driver for controlling the topological switches 12a-c based on the control signal. The control can be based on a so-called pulse-width modulation. In the case of an inverter, the input current is a direct current, and the output current is an alternating current.

The numerous topological switches 12a-c preferably form a bridge circuitry that can comprise one or more bridge circuits (i.e. half-bridges). Each bridge circuit, or half-bridge comprises one or more high-side switches (HS topological switches) connected to one another in parallel, and one or more low-side switches (LS topological switches) connected to one another in parallel. The HS topological switch(es) is/are connected in series to the LS topological switch(es). In the case of an inverter, each half-bridge is assigned to a current phase of the multiphase alternating current (output current). The semiconductor components forming the topological switches 12a-c each comprise one or more power semiconductor components such as IGBTs, MOSFETs, or HEMTs. The semiconductor material forming the basis for the respective power semiconductor component preferably comprises a so-called wide-bandgap semiconductor (semiconductor with a wide bandgap), such as silicon carbide (SiC) or gallium nitride (GaN), and/or it can comprise silicon.

Figure 2:
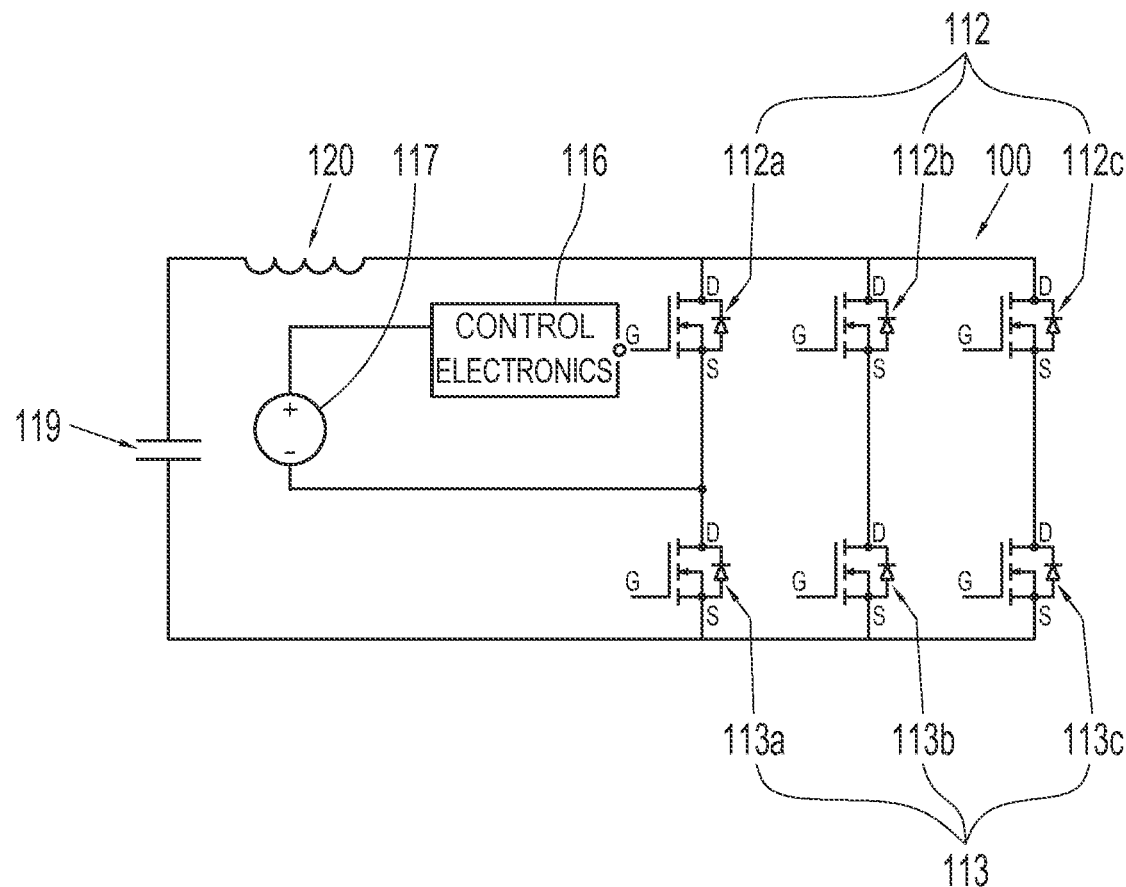
FIG. 2 shows a schematic illustration of a power module according to another embodiment.

FIG. 2 shows a schematic illustration of a power module 100 according to another embodiment. The semiconductor components 112a-c, 113a-c of the high-side topological switch 112 and the low-side topological switch 113 are shown in detail therein. Each semiconductor component 112a-c, 113a-c is a transistor, i.e. an IGBT or MOSFET, and comprises a gate connection G, a drain connection D and a source connection S. A power source 119, preferably a power battery, and an inductor 120 are schematically shown in the circuitry of the power module 100. Furthermore, the control electronics 116 is located between the gate connection G on the semiconductor component 112a and a voltage source 117.

Figure 3:
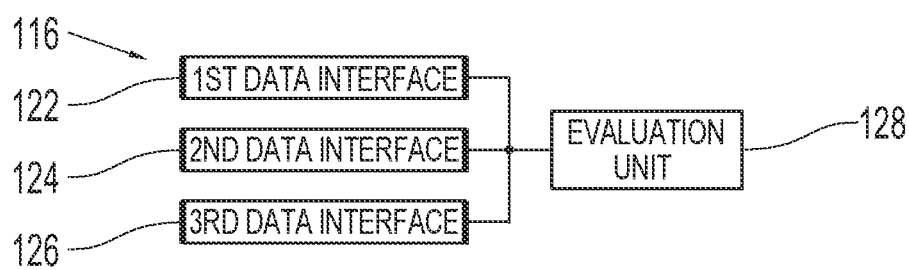
FIG. 3 shows a schematic illustration of control electronics of a power module according to various embodiments.

The control electronics 116 is shown in greater detail in FIG. 3, and configured to set a gate current for the semiconductor component 112a, preferably for all semiconductor components 112a-c, 113a-c, based on one or more status parameters for the semiconductor component 112a, or the semiconductor components 112a-c, 113a-c. The control electronics 116 comprises a first, second, and third data interface 122, 124, 126 for receiving a first, second, and third status parameter, which are continuously monitored when the power module 10 is in operation. By way of example, the status parameters are the temperature of the semiconductor component 112a, the current (in particular the drain-source current) of the semiconductor component, and the voltage at the DC link capacitor. The control electronics 116 also comprises an evaluation unit 128 for evaluating the recorded status parameter data, in order to set a gate current for the gate connection G on the semiconductor component 112a, preferably the semiconductor components 112a-c, 113a-c, based thereon. The evaluation unit 128 preferably comprises an integrated circuit for evaluating the status parameter data.

By way of example, one or more thresholds can be predefined for the respective status parameter, and the respective status parameter can be continuously monitored when the power module 10 is in operation, and compared with the threshold. When a threshold is exceeded, a gate current can be set that is assigned to the respective threshold, wherein the gate current decreases with the threshold. The gate current can be set in two steps, such that there is only one threshold for each status parameter. If this threshold is exceeded, a lower gate current is set than if the status parameter is lower than the threshold. The gate current can be set in more than two steps, such that there are numerous thresholds for the status parameter.

In this manner, a comparatively lower gate current can be set for higher values of the status parameter, such that the switching speed of the semiconductor component 112a is lower. Consequently, the probability of voltage jumps exceeding the overvoltage for the semiconductor component 112a and compromising it, is lower.

Figure 4:
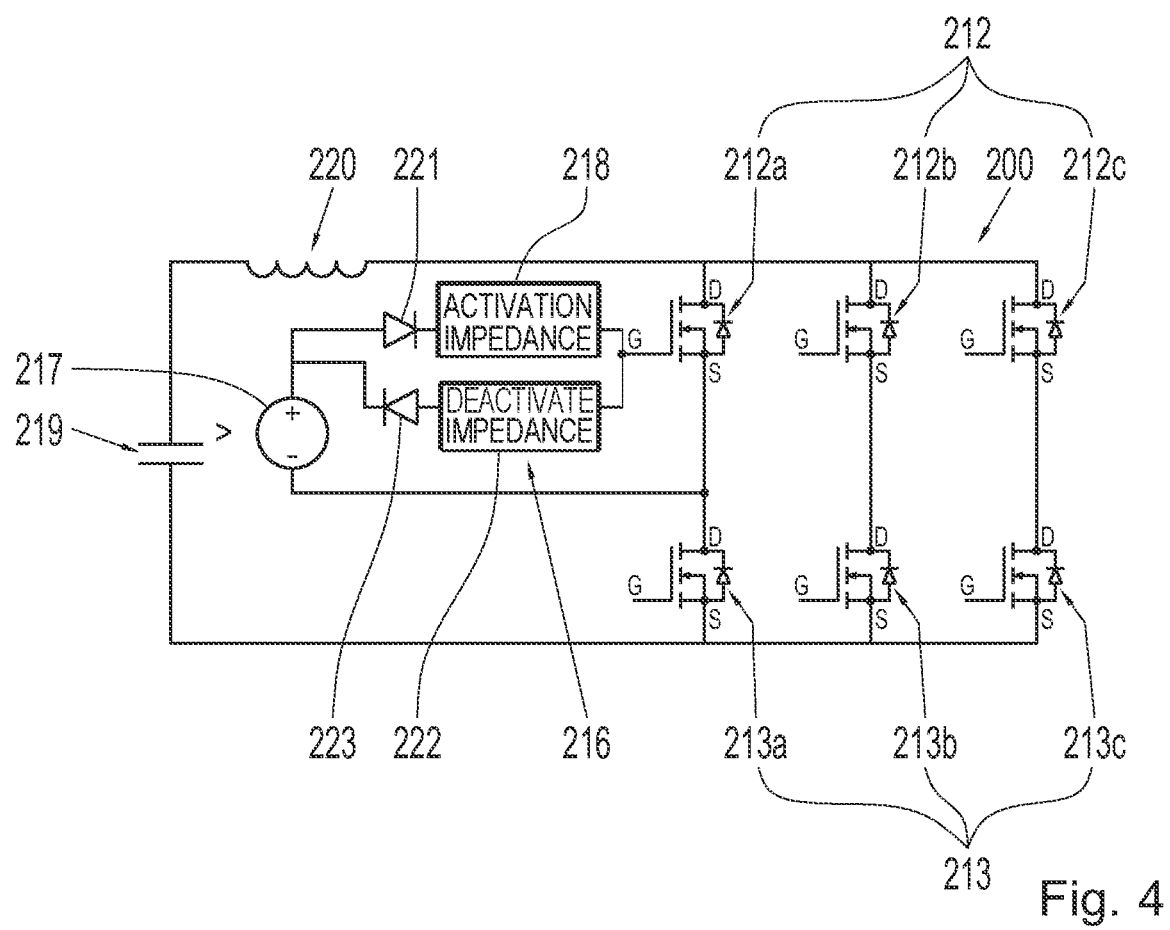
FIG. 4 shows a schematic illustration of a power module according to another embodiment.
Figure 5:
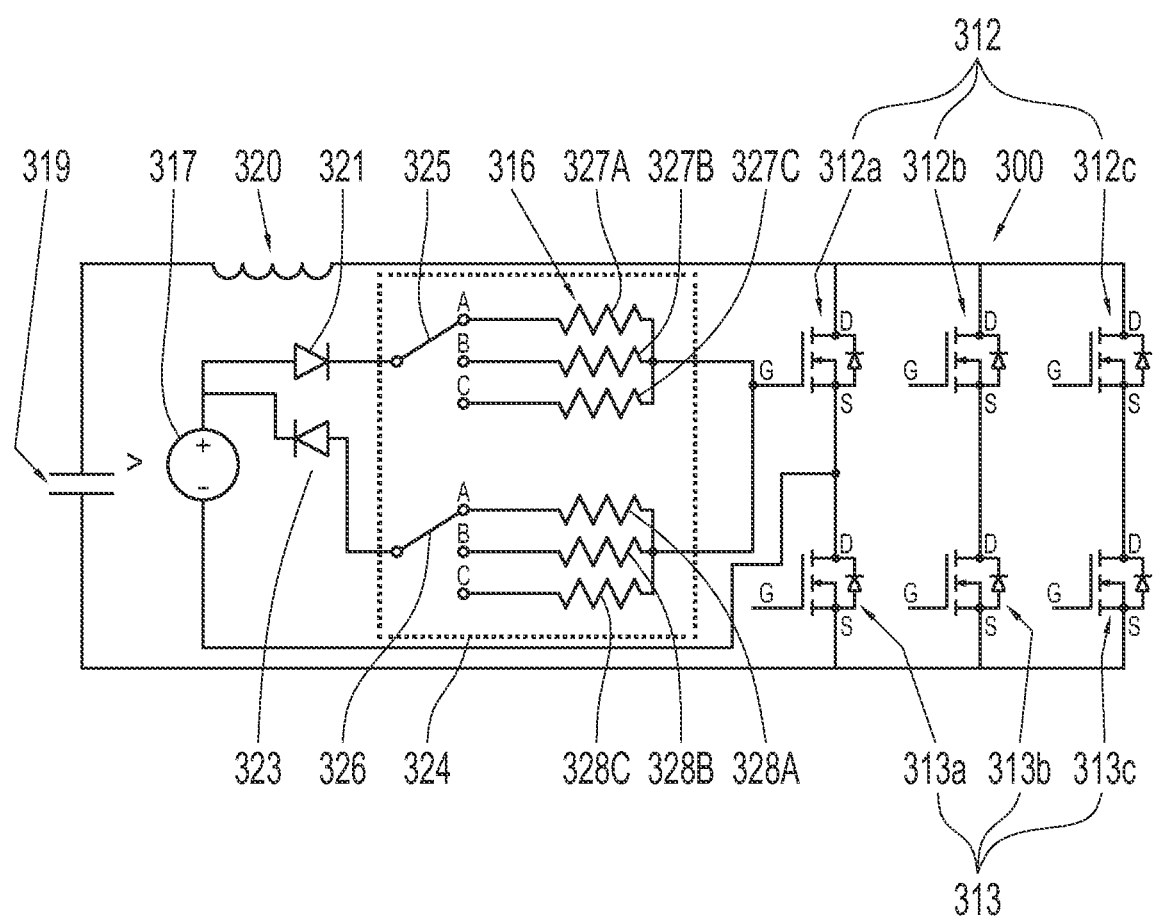
FIG. 5 shows a schematic illustration of a power module according to another embodiment.

FIG. 4 and FIG. 5 each show power modules 200, 300 according to different embodiments. Both power modules 200, 300 comprise a high-side topological switch 212, 312 that contains numerous semiconductor components 212a-c, 312a-c and a low-side topological switch 213, 313 that contains numerous semiconductor components 213a-c, 313a-c. Both power modules 200, 300 comprise a power source 219, 319 and an inductor 220, 320. Both power modules 200, 300 also comprise a control electronics 216, 316 located between a voltage source 217, 317 and a gate connection G on a semiconductor component 212a-c, 312a-c, 213a-c, 313a-c.

The control electronics 216 in the embodiment shown in FIG. 4 comprises an activation impedance 218, which is assigned in a series connection to an activation diode 221 in an activation current path in the semiconductor component 212a. The control electronics 216 also comprises a deactivation impedance 218, which is assigned in a series connection to a deactivation diode 221 in a deactivation current path in the semiconductor component 212*a*. The activation impedance 218 and the deactivation impedance 221 can be set based on one or more status parameters. Higher values for the monitored status parameter result in correspondingly higher values for the setting of the impedance. Consequently, the current flowing through the set impedance forming the gate current at the gate connection G is lower when the value for the monitored status parameter is higher.

The control electronics 316 in the embodiment shown in FIG. 5 comprises numerous activation impedances 327A-C, which can be switched on by means of a first switch 325, and numerous deactivation impedances 328A-C, which can be switched on by means of a second switch 326. The first and second switches 325, 326 form a switch assembly 324 and each comprise numerous switching points A-C, each of which is assigned to one of the numerous activation impedances 327A-C, or deactivation impedances 328A-C. The numerous activation and deactivation impedances 327A-C, 328A-C differ in their impedances. The control electronics 316 is configured to select a higher activation and/or deactivation impedance if the monitored status parameter assumes a higher value.

The control electronics 216, 316 can comprise an evaluation unit 128 and numerous data interfaces 122, 124, 126, as shown in FIG. 3.

| Reference Symbols | |
|---|---|
| 10, 100, 200, 300 | power module |
| 12a-c, 112, 113, 212, 213, 312, 313 | topological switches |
| 112a-c, 113a-c, 212a-c, 213a-c, 312a-c, 313a-c | semiconductor components |
| 14 | input contact |
| 16, 116, 216, 316 | control electronics |
| 18 | output contact |
| 117, 217, 317 | voltage source |
| 119, 219, 319 | power source |
| 120, 220, 320 | inductance |
| 122, 124, 126 | data interface |
| 128 | evaluation unit |
| 218, 327A-C | activation impedance |
| 221, 321 | activation diode |
| 222, 328A-C | deactivation impedance |
| 223, 323 | deactivation diode |
| 324 | switch assembly |
| 325 | first switch |
| 326 | second switch |

The invention claimed is:

1. A power module for operating a vehicle comprising:
   a plurality of semiconductor components, which form at least one topological switch;
   an input contact configured to supply an input current to the semiconductor components;
   control electronics configured to control the semiconductor components to generate an output current based on the input current; and
   an output contact for outputting the output current;
   wherein the control electronics are configured to set a gate current for at least one of the semiconductor components based on one or more status parameters of the semiconductor components,
   wherein the control electronics comprise an adjustable impedance between a control voltage source in the control electronics and a gate connection in the semiconductor components, and wherein the control electronics are configured to adjust the adjustable impedance to set the gate current for the at least one of the semiconductor components.

2. The power module according to claim 1, wherein the adjustable impedance comprises an activation impedance for activating the semiconductor components and a deactivation impedance for deactivating the semiconductor components.

3. The power module according to claim 1, wherein the control electronics comprise an integrated circuit configured to evaluate the one or more status parameters.

4. The power module according to claim 1, wherein the control electronics are configured to adjust the adjustable impedance to set a first gate current in response to the status parameter exceeding a predefined threshold, and adjust the adjustable impedance to set a second gate current in response to the status parameter falling below the predefined threshold, wherein the first gate current is lower than the second gate current.

5. The power module according to claim 1, wherein the control electronics are configured to adjust the adjustable impedance to decrease the gate current in response to a decrease in a monitored value of the status parameter.

6. The power module according to claim 1, wherein the one or more status parameter comprise at least one of a temperature of the semiconductor component, a voltage of a DC link capacitor, or a current in the semiconductor component.

7. The power module according to claim 6, wherein the one or more status parameters comprise a plurality of status parameters, and wherein the control electronics are configured to weight the plurality of status parameters differently from one another.

8. The power module according to claim 1, wherein the control electronics are configured to set a gate current for each semiconductor component based on a respective status parameter of a respective semiconductor component.

9. The power module according to claim 8, wherein the control electronics is configured to set the gate current for at least two semiconductor elements based on two different status parameters.

10. The power module according to claim 2, wherein the control electronics comprise an integrated circuit configured to evaluate the one or more status parameters.

11. The power module according to claim 2, wherein the control electronics are configured to adjust the adjustable impedance to set a first gate current in response to the status parameter exceeding a predefined threshold, and adjust the adjustable impedance to set a second gate current in response to the status parameter falling below the predefined threshold, wherein the first gate current is lower than the second gate current.

12. The power module according to claim 2, wherein the control electronics are configured to adjust the adjustable impedance to decrease the gate current in response to a decrease in a monitored value of the status parameter.

13. The power module according to claim 2, wherein the one or more status parameter comprise at least one of a temperature of the semiconductor component, a voltage of a DC link capacitor, or a current in the semiconductor component.

14. The power module according to claim 13, wherein the one or more status parameters comprise a plurality of status parameters, and wherein the control electronics are configured to weight the plurality of status parameters differently from one another.

15. The power module according to claim 2, wherein the control electronics are configured to set a gate current for each semiconductor component based on a respective status parameter of a respective semiconductor component.

16. The power module according to claim 1, wherein the one or more status parameter comprise at least one of a temperature of the semiconductor component, or a voltage of a DC link capacitor.

\* \* \* \* \*